United States Patent
Lal et al.

(10) Patent No.: US 7,860,331 B2
(45) Date of Patent: Dec. 28, 2010

(54) PURPOSE-DRIVEN ENHANCEMENT FILTERING OF ANATOMICAL DATA

(75) Inventors: Rakesh Mohan Lal, Waukesha, WI (US); Saad Ahmed Sirohey, Pewaukee, WI (US); Gopal B. Avinash, Menomonee Falls, WI (US)

(73) Assignee: General Electric Company, Schenectady, NY (US)

( * ) Notice: Subject to any disclaimer, the term of this patent is extended or adjusted under 35 U.S.C. 154(b) by 1070 days.

(21) Appl. No.: 11/563,016

(22) Filed: Nov. 23, 2006

(65) Prior Publication Data
US 2008/0123912 A1 May 29, 2008

(51) Int. Cl.
*G06K 9/40* (2006.01)
(52) U.S. Cl. ........................ 382/254; 382/128
(58) Field of Classification Search ........... None
See application file for complete search history.

(56) References Cited
U.S. PATENT DOCUMENTS

| | | | |
|---|---|---|---|
| 7,272,251 B2 * | 9/2007 | Acar et al. | 382/128 |
| 2006/0079743 A1 * | 4/2006 | Ferrant et al. | 600/407 |
| 2006/0251294 A1 * | 11/2006 | Soll et al. | 382/107 |
| 2008/0013852 A1 * | 1/2008 | Ghosh et al. | 382/261 |
| 2008/0107344 A1 * | 5/2008 | Blake et al. | 382/199 |

* cited by examiner

*Primary Examiner*—Vu Le
*Assistant Examiner*—Claire Wang
(74) *Attorney, Agent, or Firm*—Dean Small; Small Patent Law Group

(57) ABSTRACT

A process for purpose-specific enhancement filtering of anatomical data includes acts of selecting at least one specific purpose from a predetermined list of a plurality of analytical tools for anatomical data analysis and setting specific parameter values for the specific purpose. The process also includes acts of enhancing the anatomical data using a three-dimensional, segmentation-based filter, using the specific parameter values, to provide enhanced anatomical data and using the enhanced anatomical data for the selected specific purpose.

24 Claims, 8 Drawing Sheets

PURPOSE-DRIVEN ENHANCEMENT FILTERING OF ANATOMICAL DATA

FIELD OF THE DISCLOSURE

This disclosure relates generally to anatomical data processing technology, and in particular to systems and processes for preparing anatomical data for multiple applications via a flexible content enhancement tool.

BACKGROUND

Many medical diagnostic, surgical and interventional procedures rely on imaging tools to provide information descriptive of status of visually perceived representations of portions or organs of a patient. In part as a result of increasing sophistication of medical tools in general, and imaging apparatus in particular, more types of imaging devices are being adapted for application in the context of surgical procedures.

In many instances, medical tools capable of rendering images of organs or tissues have found great utility and have been adapted to facilitate types of surgery. These find application in many situations, and are very useful in situations where the surgeon cannot directly see the operating site, or when the features of interest are not amenable to direct visual inspection, or to enable comparison of a present image with other image data, among other instances. These applications have resulted in development of a broad variety of tools, including x-ray, CT and fluoroscopic visualizing aids, and many different types of optical imaging devices.

In many imaging applications, pixelated detectors are increasingly employed to realize electronic digital representations of image data. In turn, digital techniques provide great imaging flexibility, such as, for example, overlay or direct comparison, on the fly, of various aspects and views from various times. For example, pre-surgery images can be available, in real time, in the operating room scenario, for comparison to images reflective of the present status of the same tissues. Many other types of special-purpose enhancements are now also possible. In some instances, imaging aids, such as contrast-enhancing agents, are introduced into the subject or patient to aid in increasing available data content from the imaging technique or techniques being employed.

Increasing sophistication of these visualization apparatus also result in significant cost, not only develop these devices, but also to acquire them, to train operators in using them, and service technicians to maintain them, and in educating physicians to be familiar with their capabilities and benefits. As a result, a significant investment is involved with respect to each such tool.

The advent of digital imaging technologies resulted in a large number of new medical applications and usages for imaging tools. Initially, two-dimensional images were formed using recording media, and, subsequently, of picture elements or pixels. However, more sophisticated techniques evolved capable of realizing datasets of volume-descriptive data comprising aggregations of unit cells, known as voxels. A rich variety of different techniques for employing such voxels to provide information have followed that evolution, coupled with a desire for ability to employ progressively lower radiation doses in order to be able to form detailed anatomical descriptions.

Digital images are made up of pixels, and these images are generally visualized by assigning each pixel a numerical value corresponding to a color or a shade of gray, and then displaying that assigned representation in the corresponding position for that pixel on a graphical display. A digital image can be adjusted by varying the numerical values of each pixel, for example by forming each pixel as a weighted combination of images formed at different times, or formed from illumination from different spectral components or by combining images including fluorescent image data and reflected image data. Raw image data may be manipulated by software using algorithms and mathematical computations to optimize particular aspects providing information about structures in the subject. These types of images, alone or in combination with other data, provide useful tools for improving medical procedures.

For the reasons stated above, and for other reasons discussed below, which will become apparent to those skilled in the art upon reading and understanding the present disclosure, there are needs in the art to provide more highly automated image computation engines, and more generally-applicable protocols for application and usage of such capabilities, in order to streamline gathering and analysis of information in support of increasingly stringent and exacting performance and economic standards in settings such as medical imaging.

BRIEF DESCRIPTION

The above-mentioned shortcomings, disadvantages and problems are addressed herein, which will be understood by reading and studying the following disclosure.

In one aspect, a process for purpose-specific enhancement filtering of anatomical data includes acts of selecting at least one specific purpose from a predetermined list of a plurality of analytical tools for anatomical data analysis and setting specific parameter values for the specific purpose. The process also includes acts of enhancing the anatomical data using a three-dimensional, segmentation-based filter, using the specific parameter values, to provide enhanced anatomical data and using the enhanced anatomical data for the selected specific purpose.

In another aspect, a module for purpose-specific enhancement filtering of anatomical data is disclosed. The module includes elements for selecting at least one specific purpose from a predetermined list of a plurality of analytical tools for anatomical data analysis and setting specific parameter values for the specific purpose. The module also includes elements for enhancing the anatomical data using a three-dimensional, segmentation-based filter, using the specific parameter values, to provide enhanced anatomical data and using the enhanced anatomical data for the selected specific purpose.

Systems, processes, and computer-readable media of varying scope are described herein. In addition to the aspects and advantages described in this summary, further aspects and advantages will become apparent by reference to the drawings and by reading the following detailed description.

DETAILED DESCRIPTION

In the following detailed description, reference is made to the accompanying drawings that form a part hereof, and in which are shown, by way of illustration, specific embodiments that may be practiced. These embodiments are described in sufficient detail to enable those skilled in the art to practice the embodiments, and it is to be understood that other embodiments may be utilized, and that logical, mechanical, electrical and other changes may be made, without departing from the scope of the embodiments.

The detailed description is divided into five sections. In the first section, a system level overview is provided. In the second section, examples of processes for purpose-specific enhancement of features relevant to a selected purpose are described. In the third section, examples showing side-by-side comparisons of images derived from anatomical data demonstrating specific enhancement and artifact suppression effects are discussed.

The fourth section discloses hardware and an operating environment, in conjunction with which embodiments may be practiced. The fifth section provides a conclusion which reviews aspects of the subject matter described in the preceding four segments of the detailed description. A technical effect of the subject matter described herein includes multi-purpose filtering of three-dimensional anatomical data using a single, user-tunable tool, for purposes including rendering of two- or three-dimensional visual simulations of internal anatomical features, or automated detection of specific types of pathology from the same three-dimensional anatomical data, or for quantification of pathological tissues, also from the same three-dimensional anatomical data.

I. SYSTEM OVERVIEW

Figure 1:
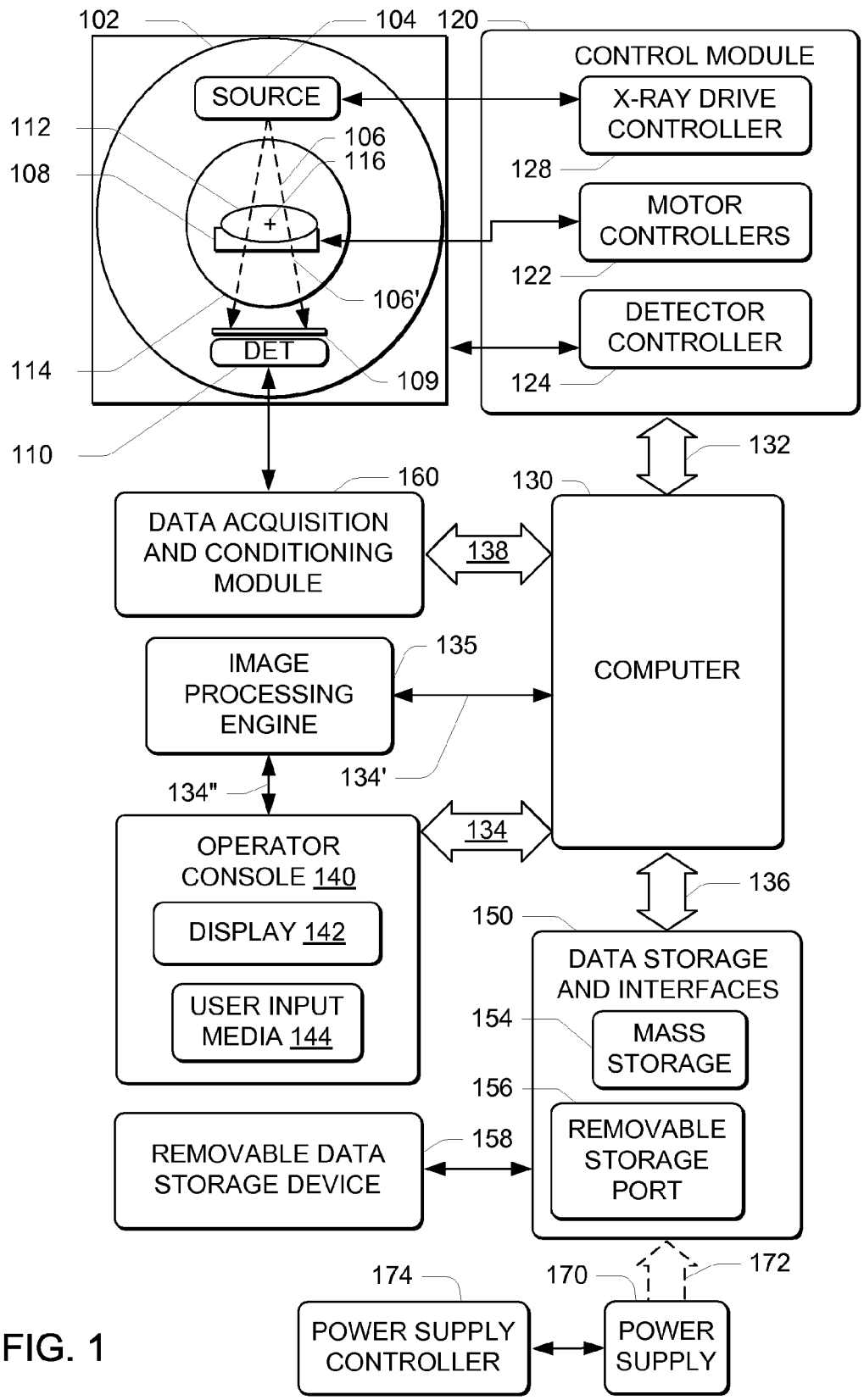
FIG. 1 is a block diagram of a system configured to provide and then enhance three-dimensional anatomical data in conformance with one or more purpose-specific applications.

FIG. 1 is a simplified diagram of an overview of a modified system 100 configured to improve X-ray imaging operations. The system 100 optionally includes a gantry 102 or other support for an illumination source 104, such as an X-ray illumination source, capable of providing illumination 106, such as X-rays or other non-destructive internal imaging illumination, and may optionally include a test subject support 108 that is transmissive with respect to the illumination 106 and that is positioned above a scintillator 109 and detector 110 that is also opposed to the illumination source 104. Alternatively, a direct conversion detector 110 may be employed without need for a scintillator.

In one embodiment, components of the system 100 and a test subject 112 are maintained in a defined geometric relationship to one another by the gantry 102. A distance between the illumination source 104 and the detector 110 may be varied, depending on the type of examination sought, and the angle of the illumination 106 respective to the test subject 112 can be adjusted with respect to the body to be imaged responsive to the nature of imaging desired.

In one embodiment, the test subject support 108 is configured to support and/or cause controlled motion of the test subject 112, such as a living human or animal patient, or other test subject 112 suitable for non-destructive imaging, above the scintillator 109/detector 110 so that illumination 106' is incident thereon after passing through the test subject 112. In turn, information from the detector array 110 describes internal aspects of the test subject 112.

The scintillator 109 may be a conventional CsI scintillator 109, optically coupled to an array of photodiodes (not illustrated), such as a two-dimensional array of photodiodes and suitable control transistors formed using semiconductor material such as amorphous silicon, or any other form of detector 110 suitable for use with the type or types of illumination 106 being employed, such as X-rays. The detector elements are typically tesselated in a mosaic. The scintillator 109 converts incident photons comprising electromagnetic radiation, such as X-rays, from high-energy, high-frequency photons 106', into lower-energy, lower-frequency photons corresponding to spectral sensitivity of the detector elements, in a fashion somewhat analogous to fluorescence, as is commonly known in the context of many visible-light sources in use today. Alternatively, the detector 110 may be formed as a flat-panel array including amorphous Silicon ($\alpha$-Si) active elements, together with either a scintillator layer 109, or a direct converter material such as Cadmium Zinc Telluride (CdZnTe), Mercuric Iodide ($HgI_2$), Lead Iodide ($PbI_2$), or amorphous Selenium ($\alpha$-Se).

In some modes of operation, such as CT, the gantry 102 and test subject support or table 108 cooperatively engage to move the test subject 112 longitudinally, that is, along an axis extending into and out of the plane of FIG. 1, and within an opening 114. In some modes of operation, the gantry 102 rotates the X-ray source 104 and detector 110 about the axis 116, while the support 108 moves longitudinally, to provide a helical series of scans of the test subject 112, where a pitch of the helices is defined as a ratio of a longitudinal distance traveled by the table 108 during a complete revolution of the gantry 102, compared to a length of the detector 110 along the axis 116 of linear motion.

The system 100 also optionally includes a control module or controller 120. The controller 120 may include a motor control module 122 configured to move the test subject support 108 and thus the test subject 112 relative to the X-ray source 104 and/or detector 110, and may also control motors in the gantry 102 or to position the X-ray illumination source 104 relative to the test subject 112 and/or the detector 110.

The controller 120 includes a detector controller 124 configured to control elements within the detector 110 and to facilitate data transfer therefrom. The controller 120 also includes a drive parameter controller 128 configured to control electrical drive parameters delivered to the X-ray source 104. One or more computers 130 provide connections to the controller 120 via a bus 132 configured for receiving data descriptive of operating conditions and configurations and for supplying appropriate control signals. Buses 134, 134' and 134" act to transfer data and control signals, for example with respect to a module 135, configured as an image processing engine, via interconnections such as 134', 134" that are configured for exchange of signals and data to and/or from the computer 130 as well as other elements of the system 100 and/or external computation or communications resources.

The system 100 also includes a bus 136, a bus 138 and an operator console 140. The operator console 140 is coupled to the system 100 through the bus 134. The operator console 140 includes one or more displays 142 and a user input interface 144. The user input interface 144 may include a keyboard, a mouse or other tactile input device, capability for voice commands and/or other input devices. The one or more displays 142 provide video, symbolic and/or audio information relative to operation of system 100, user-selectable options and images descriptive of the test subject 112, and may display a graphical user interface for facilitating user selection among various modes of operation and other system settings.

The image processing engine 135 facilitates automation of accurate measurement and assessment. The image processing engine 135 is capable of forming multiple, coordinated images for display, for example via the monitor 142, to provide the types of depictions described below with reference to Section III and associated FIGs. The image processing engine 135 may comprise a separate and distinct module, which may include application-specific integrated circuitry, or may comprise one or more processors coupled with suitable computer-readable program modules, or may comprise a portion of the computer 130 or other computation device.

The system 100 also includes memory devices 150, coupled via the bus 136 to the computer 130 through suitable interfaces. The memory devices 150 include mass data storage capabilities 154 and one or more removable data storage device ports 156. The one or more removable data storage device ports 156 are adapted to detachably couple to portable data memories 158, which may include optical, magnetic and/or semiconductor memories and may have read and/or write capabilities, and which may be volatile or non-volatile devices or may include a combination of the preceding capabilities.

The system 100 further includes a data acquisition and conditioning module 160 that has data inputs coupled to the detector 110 and that is coupled by the bus 138 to the one or more computers 130. The data acquisition and conditioning module 160 includes analog to digital conversion circuitry for capturing analog data from the detector 110 and then converting those data from the detector 110 into digital form, to be supplied to the one or more computers 130 for ultimate display via at least one of the displays 142 and for potential storage in the mass storage device 154 and/or data exchange with remote facilities (not shown in FIG. 1). The acquired image data may be conditioned in either the data acquisition and conditioning module 160 or the one or more computers 130 or both.

The system 100 also includes a power supply 170, coupled via interconnections represented as a power supply bus 172, shown in dashed outline, to other system elements, and a power supply controller 174. In some embodiments, the system 100 is configured to be a mobile system equipped with a portable power supply 170, such as a battery. In other words, the system 100 may comprise a wheeled unit and may be electromotively powered in self-contained fashion, lending physical agility to the ensemble of attributes offered by the system 100.

Volumetric data collected via exposure of the test subject 112 to suitable illumination 106 may be processed via many different types of tools, each intended to enhance some portion of information content described by the data. One result can be inconsistency between analytical results form different types of signal processing tools, even when a single body of volumetric data provides information via these tools. The processes of Section II reduce those inconsistencies by handling the volumetric data in similar ways, with parameters adjusted in purpose-specific manner, to reduce obfuscation of information from artifacts in the input dataset not related to the anatomical aspects of the data.

II. EXEMPLARY PROCESSES

Figure 2:
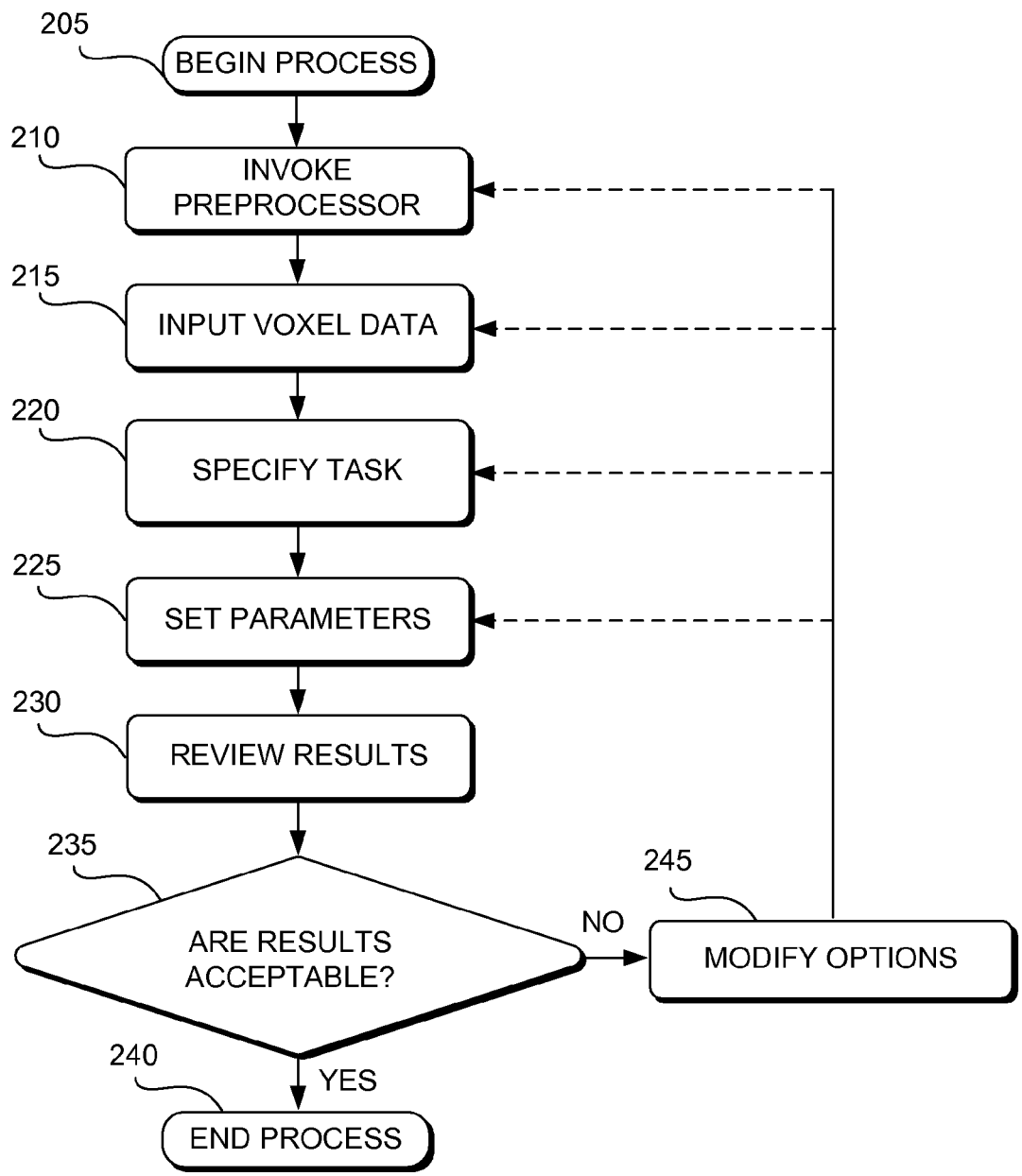
FIGS. 2 and 3 are simplified flow charts of processes capable of utility in the system of FIG. 1.
Figure 3:
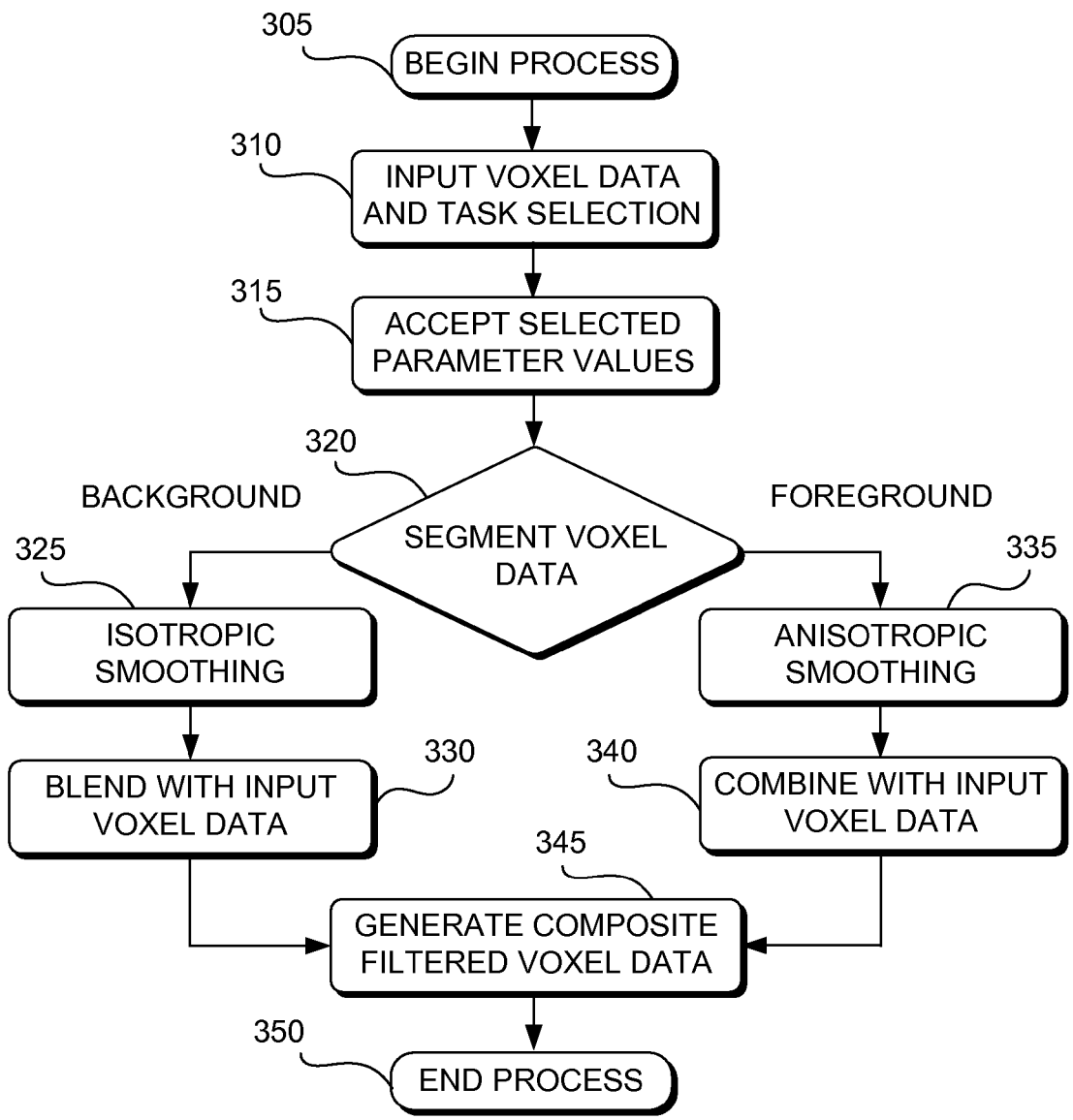

FIGS. 2 and 3 are simplified flow charts of processes 200 and 300, respectively, which are capable of utility in the system 100 of FIG. 1. FIG. 2 describes, in broad terms, application of the preprocessing tool of the present disclosure to voxel data descriptive of anatomical data, to prepare that data for a purpose-specific application. The process 200 begins in a block 205.

In a block 210, the process 200 invokes the preprocessor of the present disclosure. The preprocessor may be realized via application-specific circuitry coupled to a memory, or as one or more software modules comprising computer-executable instructions that, when executed by one or more processors, such as the computer 130 of FIG. 1, or one or more remote processors, or a combination thereof, causes the one or more processors to modify the voxel data as described below. Control then passes to a block 215.

In the block 215, the process 200 obtains a body of voxel data representative of anatomical features, for example, obtained via a tomographic scan of a patient 112 from operation of the system 100 of FIG. 1. Alternatively, other types of voxel data descriptive of internal aspects of a patient may be modified through processes analogous to those of the present disclosure, including data such as might be obtained via techniques such as MRI, PET or other diagnostic imaging tools. Control then passes to a block 220.

In the block 220, a user specifies a task or purpose, for example via user input media 144, or otherwise (for example, using a computer-based system remote from the system 100), for preprocessing of the body of voxel data. In one embodiment, the block 220 accepts an indication, from a user, of selection of a purpose from a predetermined list of a plurality of analytical tools for anatomical data analysis, where the list may include, for example: visualization of an image formed using at least a portion of the enhanced anatomical data; differentiation and characterization of distinct areas within an anatomical volume represented by the enhanced anatomical data; and detection of tissue abnormality. In one embodiment, the process 200 will apply purpose-specific enhancement filtering of anatomical data, in conformance with parameter values to be selected in a block 225.

Alternatively, signal conditioning aspects applicable to a broad variety of subsequent analytical purposes may be indicated via the parameter values selected in the block 225. For example, signal-to-noise corruption specific to a particular data-collection tool may be addressed, in order to realize intermediate volumetric or voxel data that presents data offering uniform suppression of artifacts resulting from the particular data collection modality. Such artifacts offer characteristics that may be identified by, and reduced or eliminated in anatomical data, by a preprocessing tool in a way that is consistent with subsequent application of the data to one or more characterization tools.

One type of such artifact is known as "beam-hardening" of tomographic data. "Beam-hardening" is a term of art indicating streak-like distortions arising from wavelength-dependent transmission characteristics manifesting in tomographic data collected via polychromatic x-ray illumination sources 104, where presence of articles specific to the individual 112, such as stents, or other implants—hip joints, rods etc.—may result in degradation of image or information quality of areas of the imaged volume, even at some distance away from these objects.

Following specification of a purpose-specific task in the block 220, control passes to the block 225. In the block 225, parameter values specific to the purpose indicated in the block 220 are selected. Examples of the types of parameters for which values are selected include a focus parameter, a smooth parameter and an edge parameter, and smoothing parameters for anisotropic and isotropic three-dimensional smoothing. Control then passes to a block 230.

In the block 230, a review of results is performed. In a query task 235, acceptability of the results for the purpose specified in the block 220 is determined.

When the query task 235 determines that the results are not acceptable, control passes to a block 245. In the block 245, options associated with the process 200 are modified, and control passes to a selected block as indicated by the dashed arrows. For example, the process 200 may be re-initiated, by returning to the block 210. A different input voxel data group may be appropriate, in which case control passes back to the block 215; alternatively, a different task may be specified in the block 220, or a different set of parameter values may be specified in the block 225, and, in these events, the process 200 iterates.

When the query task 235 determines that the results are acceptable, the process 200 ends in a block 240. The input voxel data accepted in the block 215 have been processed, for example to achieve enhancement of signal-to-noise content, using a three-dimensional, segmentation-based filter that is tuned via the parameter values selected in the block 225 for the intended application. As a result, intermediate, but enhanced, anatomical voxel data are output that are suitable for use the for the selected specific purpose.

FIG. 3 is a simplified flow chart of a process 300. The process 300 begins in a block 305.

In a block 310, input voxel data descriptive of an anatomical region of interest are input, and a specific purpose for which the input voxel data are to be used is specified. Parameter values in conformance with the selected purpose are specified in the block 315, as described above with reference to the process 200 of FIG. 2. Control then passes to a block 320.

In the block 320, the input voxel data are parsed or segmented into foreground regions and background regions. This is effected by first identifying edge portions within the body of voxel data. The edge portions are located by comparing three-dimensional gradient vectors computed at each location of a series of locations within the body of voxel data to a threshold value determined by the focus parameter value selected in the block 315.

The edge portions define a boundary between the foreground and background regions using the three-dimensional gradient vectors and the threshold value. The boundary is formed as a series of two-dimensional planar portions each instantaneously orthogonal to the respective three-dimensional gradient at each location. Control then passes to blocks 325 and 330 for the background regions, and to blocks 335 and 340 for the foreground regions.

In the block 325, isotropic three-dimensional filtering is applied to the background, or non-structure, data to provide smoothed background voxel data. In one embodiment, isotropically smoothing of the background voxel data is performed using an isotropic three-dimensional Gaussian filter together with an isotropic smooth parameter value set in the block 315 to homogeneously reduce noise in the body of voxel data. Other types of three-dimensional smoothing may be employed, in order to average magnitudes representative of neighboring voxels to achieve a degree of smoothing appropriate to the selected task. Control then passes to a block 330.

In the block 330, the isotropically smoothed background voxel data are blended with input voxel data corresponding to the background voxel areas. The blending uses weighted contributions from each of the smoothed and input voxel data, using a value for a blend parameter that had been set in the block 315.

In the block 335, anisotropic three-dimensional filtering is applied to the foreground voxel data, which represents one or more anatomical structures. Specifically, at each voxel in the foreground region, the gradient direction is computed. A plane that is orthogonal to the gradient is defined at each voxel. The gradient represents the direction in which the voxel intensities are changing most rapidly, and, consequently, this direction reflects the normal to an implicit surface defined at the given voxel. Thus, two-dimensional smoothing done in the orthogonal plane using an anisotropic smoothing parameter value selected in the block 315 removes noise and suppresses artifacts below a certain magnitude, and preserves the surfaces of interest in these regions. Control then passes to a block 340.

In the block 340, weighted contributions from the smoothed foreground voxel data are combined with corresponding portions of the input voxel data. The weighting is specified by the parameter value selected for the edge parameter, in the block 315.

In a block 345, a composite intermediate voxel data set is generated by combining the blended background voxel data with the anisotropically smoothed and sharpened foreground voxel data. The process then ends in the block 350.

The degree of smoothing that is desirable or appropriate depends on the nature of the specific purpose for which the voxel data are to be used. For tasks that result in visual images, such as volume rendering, excessive smoothing can result in images that appear "cartoonish" or that present oversimplified images. For tasks such as automated pathology detection or reliable and repeatable quantification of pathology, for example to determine if a lesion has been reduced in size during treatment, more smoothing may be appropriate to reduce the sensitivity of the processing to noise-induced variations. Usage of similar or the same parameter values tends to improve consistency of assessment from one measurement to a later measurement of the same lesion, and processing of voxel data sets using a kernel of fixed physical size, as in the presently-disclosed subject matter, also reduces variations in assessment induced by factors other than changes in the sizes of the lesions themselves. Examples illustrating the application of the processes 200 and 300 of FIGS. 2 and 3 are provided below with reference to FIGS. 4 through 11, in Section III.

III. EXAMPLES

In the previous section, broad-based, tunable processes 200 and 300, relevant to conditioning and enhancing volumetric anatomical datasets in conformance with a menu of selectable purposes, were disclosed and described. In this section, a limited series of side-by-side image pairs derived from bodies of voxel data relevant to anatomical components demonstrating purpose-specific enhancement of particular elements represented by the voxel data, are provided in FIGS. 4 through 11.

A. Volume Rendering Example

Figure 4:
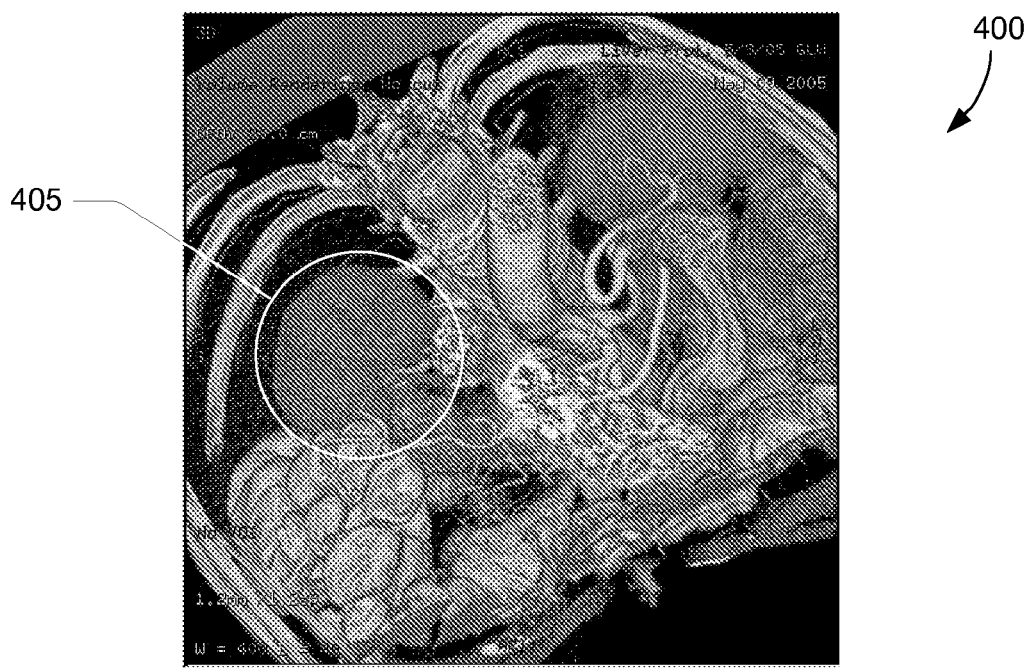
FIGS. 4 and 5 show volume renderings demonstrating enhancement of signal to noise ratio in representation of anatomical data, and of increasing visual contrast between healthy and pathological tissues.
Figure 5:
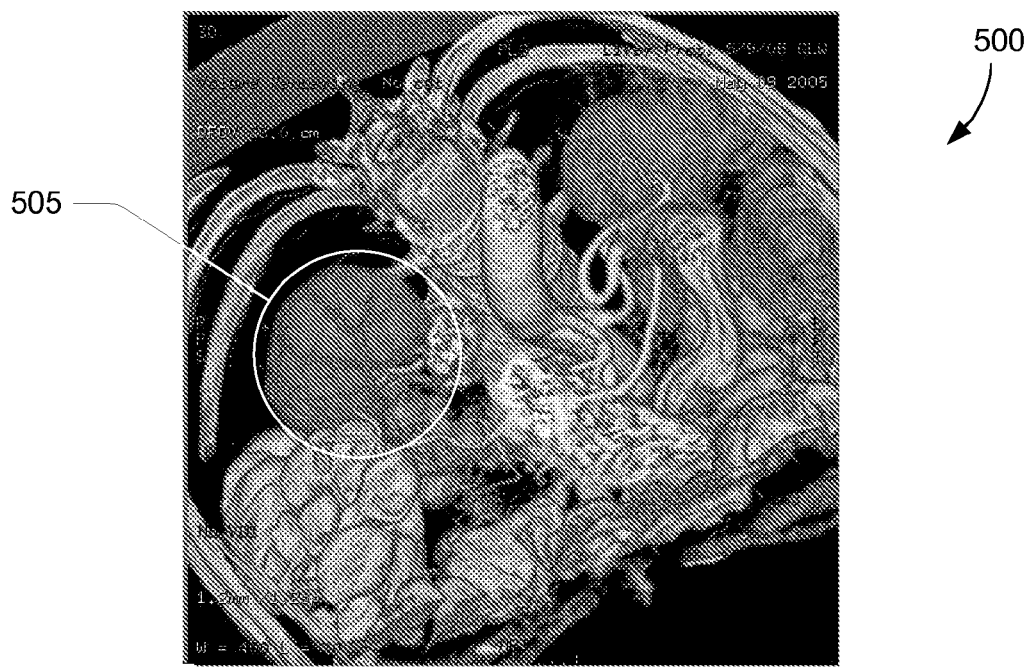

FIGS. 4 and 5 show volume renderings 400 and 500, respectively, with contrast of FIG. 5 to FIG. 4 demonstrating enhancement of signal to noise ratio in representation of anatomical data, and of increasing visual contrast between healthy and pathological tissues. The image 400 shown in FIG. 4 illustrates a volume rendering that did not include the preprocessing described above, while the image 500 in FIG. 5 has been enhanced. As a result, the anatomy illustrated in the enhanced image 500 has significantly more definition and provides a sharper display of the contrast between various anatomical elements, as seen from comparison of insets 405 and 505.

Volume rendering is used for focusing on a specific portion of the anatomy that is under examination. Noise introduces jaggedness of contrast boundaries, and those irregularities may manifest as bumps and divots, when volume rendering is applied. This is visible in the image 400 shown in FIG. 4.

When large anatomical regions are being visualized via volume rendering (e.g., the abdominal aorta, for instance) the focus parameter is set to a relatively high value, such as 3.0, so that only strong edges are considered part of the foreground. This also facilitates unification of the identified edge components without errors due to small artifacts which may have strong contrast gradients. Conversely, when the intent is to enhance small structures, the focus parameter should be set to a low value, to include many weaker edges into the foreground regions, so they can be preserved during the filtering.

B. Quantitation/Segmentation Example

Figure 6:
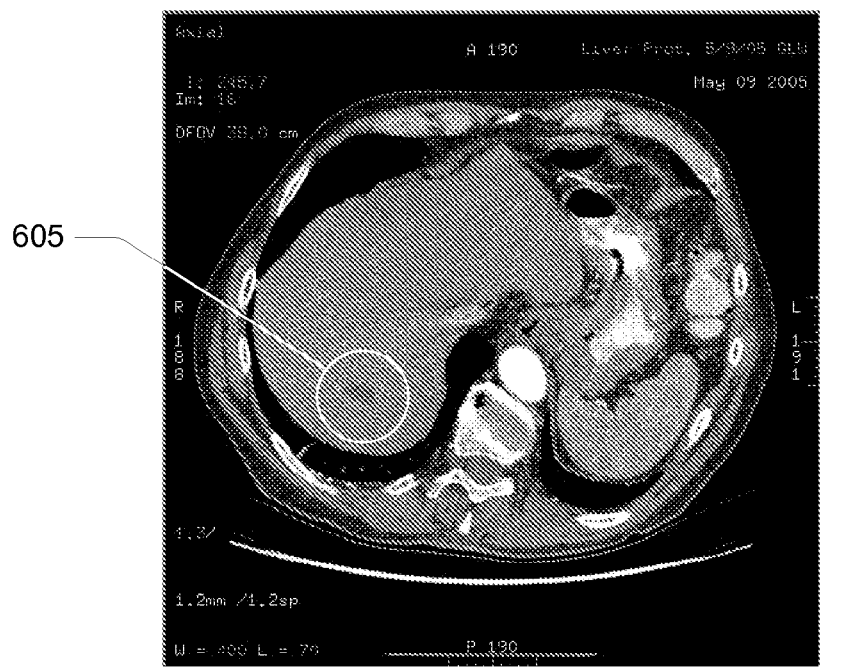
FIGS. 6 and 7 pictorially represent, in combination, improved potential for distinction of pathological from background anatomical data through application of the preprocessor of the present disclosure, thus promoting robust discrimination and subsequent quantification of pathological tissue relative to normal anatomical data.
Figure 7:
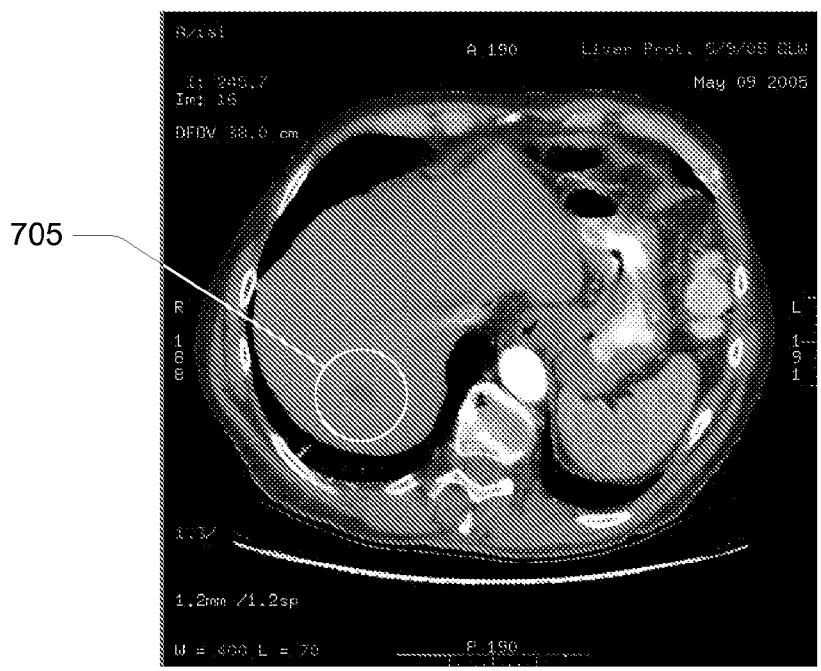

FIGS. 6 and 7 pictorially represent examples 600 and 700 of images of liver tissue, which, in combination, show improved potential for distinction of pathological from background anatomical data, through application of the processes 200 and 300 of FIGS. 2 and 3 of section II of the present disclosure. Segmentation, in the sense used here, involves identifying pathological features, or segmenting those features. This may be employed for quantification of the size of a lesion, for example, such as indicated by the darker spot within inset 605.

Detection, segmentation or quantification algorithms will likely have better success on the enhanced data exemplified in FIG. 6, due to the lower noise levels and higher contrast between the pathology and other aspects of the anatomical feature, in this instance, a liver. Inset 705 shows improved contrast of the lesion to the background parenchyma.

Quantitation of suspicious objects, i.e. lesions, plays a critical role in assessing malignancy (in growth), or effect of therapy (in stabilizing or shrinking of size). Lesions that are in high contrast anatomical areas (i.e. lung, colon) are easier to segment and quantify using automated tools, than those in lower contrast areas (i.e. liver, kidneys, brain etc). In computerized tomographic imaging, the low contrast regions are artificially enhanced using contrast injection to make lesions prominent for detection and quantification.

A key problem with segmenting and quantifying liver lesions is the lack of repeatability due to various inconsistencies in the contrast uptakes of the lesions due to improper timing of contrast and the imaging. The three-dimensional data enhancement filter of the present disclosure provides enhancement of the anatomy to create a more robust contrast between the contrast-agent enhanced lesion and the surrounding parenchyma. In turn, this tends to improve consistent segmentation and quantification that can be relied on for growth/change analysis.

Figure 8:
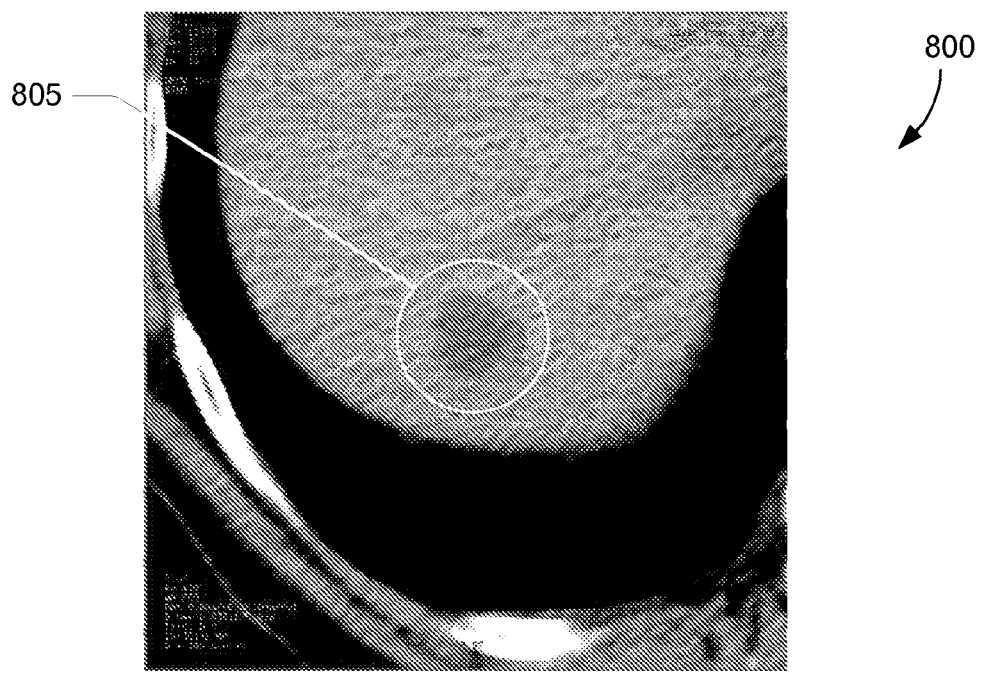
FIGS. 8 and 9 pictorially represent, via comparison of cross-sectional views, improved distinction of pathological from background anatomical data, promoting robust discrimination and subsequent quantification of potential pathology from anatomical data.
Figure 9:
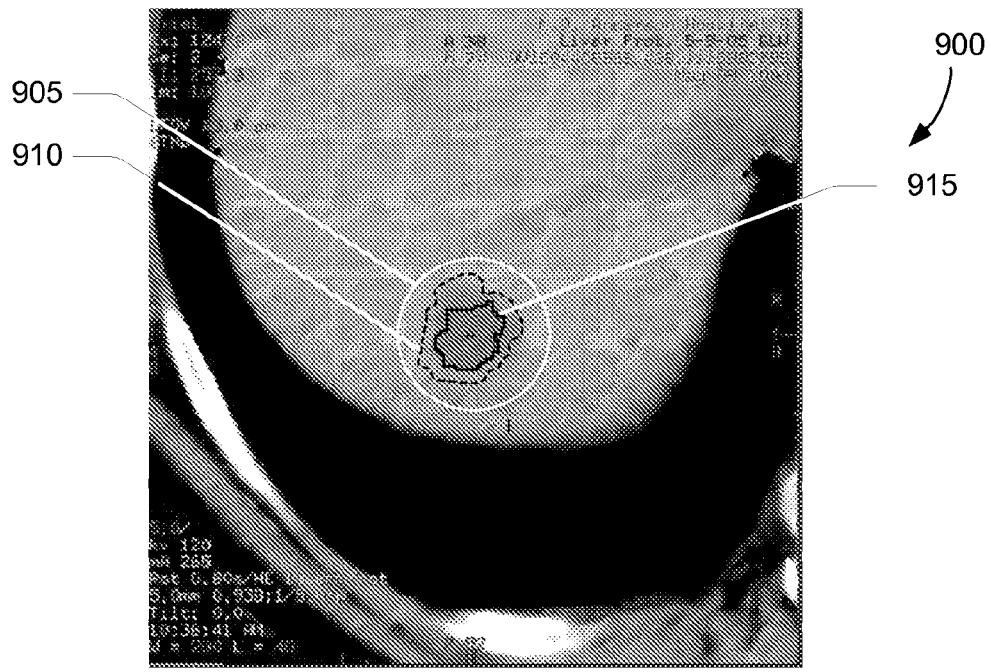

FIGS. 8 and 9 provide, through comparison of detailed and enlarged views 800 and 900 and respective insets 805 and 905 of the examples 600 and 700 of FIGS. 6 and 7, improved distinction of pathological lesions 905 from background anatomical data, promoting robust discrimination and subsequent quantification of potential pathology from anatomical data. FIG. 8 includes an enlarged view 800 prepared from the input voxel data exemplified in FIG. 6, while FIG. 9 shows an enlarged view 900 of the enhanced voxel data analogous to that of FIG. 7.

A boundary 910, shown in dashed outline, roughly corresponds to a visual impression of the lesion. The example outline 915 of FIG. 9 provides an example of segmentation using enhancement setting at moderate focus levels, and illustrates how an automated tool might differentiate and quantify the volume of such a lesion. FIGS. 8 and 9 provide an example demonstrating robust discrimination aids for identifying, and subsequently quantifying, pathological tissues, relative to normal anatomical data.

C. Volume Computer-Aided Reading Enhancement

Noise in images tends to create erroneous detection errors for automated detection algorithms like computer-aided diagnosis (CAD) and volume computer-assisted reading (VCAR). VCAR is an example of a purpose-specific detection technique that targets specific anatomies in a customizable manner. However, these types of tools are prone to distortions or errors induced by noise in the image data. Further, different anatomies have different sources of noise, for example, computerized tomography angiographic imaging of tissues in the brain have noise and artifacts resulting from the bone in the skull, which would not be present for other types of imaging.

Figure 10:
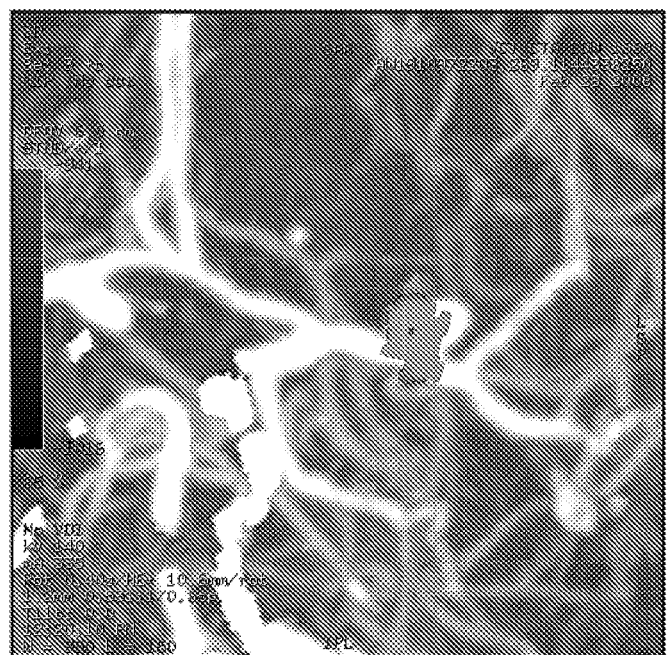
FIGS. 10 and 11 demonstrate simulations of three-dimensional views of internal anatomy, where FIG. 11 provides increased differentiation of specific anatomical features, coupled with suppression of other image data extraneous to the specific selected purpose noticeable in the image of FIG. 10.
Figure 11:
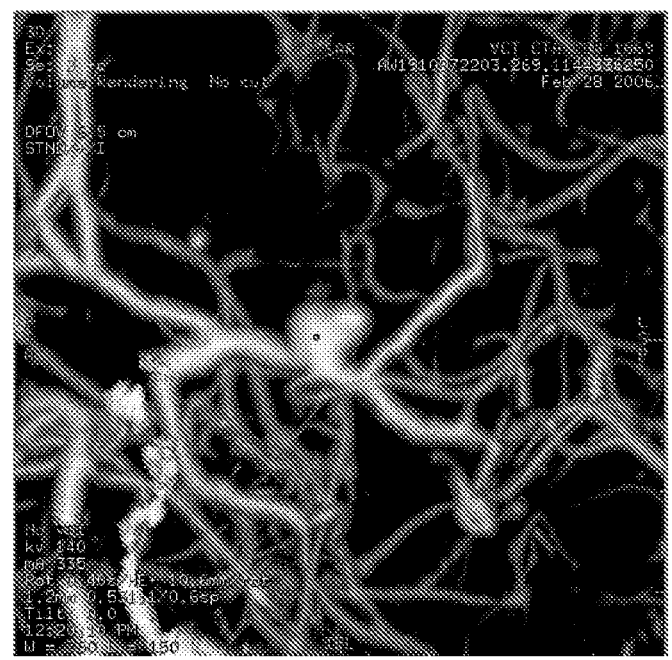

FIGS. 10 and 11 demonstrate simulations 1000 and 1100, respectively, of three-dimensional views of internal anatomy, where FIG. 11 provides increased differentiation of specific anatomical features, coupled with suppression of other image data extraneous to the specific selected purpose noticeable in the image 1000.

While contrast agents do improve distinction of low-contrast tissues, the example of FIG. 10 shows that the vasculature is somewhat obscured by presence of variation in the non-structure or background features present in the image. The contrast-enhanced vasculature is further enhanced, as shown via the image 1100 of FIG. 11, using the disclosed three-dimensional filtering, allowing for better distinction of the structures from the background, thus further aiding in automated detection of the aneurysm. A moderate focus setting was used for the filtering used to provide the image 1100 of FIG. 11. The three-dimensional enhancement, followed by shape-based detection, provided a clearer contrast of the vasculature which aids processing algorithms for automated pathology detection in providing improved performance.

The examples of FIGS. 4 through 11 illustrate that a tunable preprocessing tool for conditioning voxel data increases the usability of the voxel data for a variety of different applications, using the same computer-based tools, but with user-selectable parameter values that are adjustable to those specific purposes. An example of a computer useful in implementing this type of preprocessor is described below with reference to Section IV.

IV. HARDWARE AND OPERATING ENVIRONMENT

Figure 12:
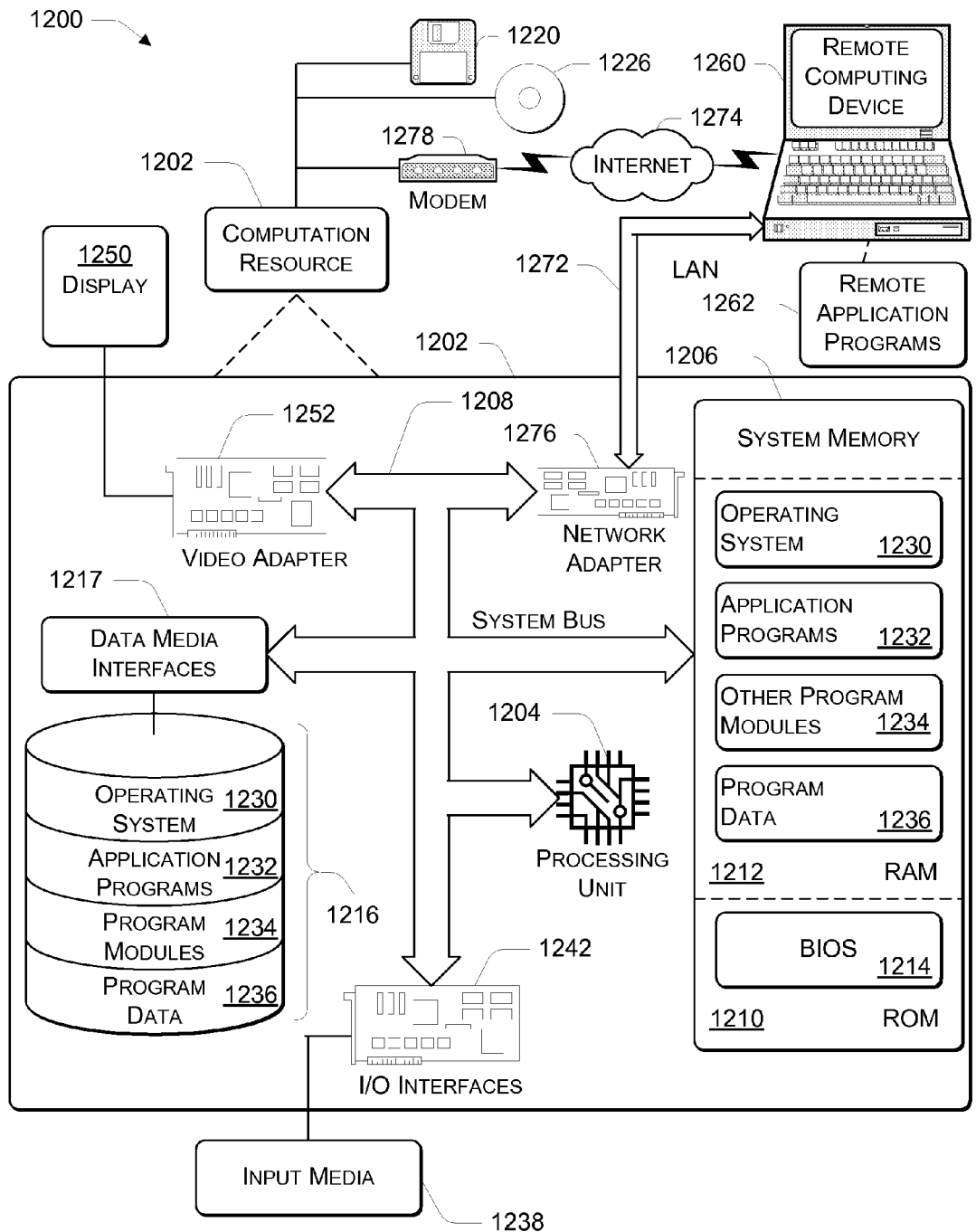
FIG. 12 illustrates an example of a general computation resource useful in the context of the environment of FIG. 1.

FIG. 12 illustrates an example of a general computer environment 1200 that includes a computation resource 1202 capable of implementing the processes described herein. It will be appreciated that other devices may alternatively used that include more components, or fewer components, than those illustrated in FIG. 12.

The illustrated operating environment 1200 is only one example of a suitable operating environment, and the example described with reference to FIG. 12 is not intended to suggest any limitation as to the scope of use or functionality of the embodiments of this disclosure. Other well-known computing systems, environments, and/or configurations may be suitable for implementation and/or application of the subject matter disclosed herein.

The computation resource 1202 includes one or more processors or processing units 1204, a system memory 1206, and a bus 1208 that couples various system components including the system memory 1206 to processor(s) 1204 and other elements in the environment 1200. The bus 1208 represents one or more of any of several types of bus structures, including a memory bus or memory controller, a peripheral bus, an accelerated graphics port and a processor or local bus using any of a variety of bus architectures, and may be compatible with SCSI (small computer system interconnect), or other conventional bus architectures and protocols.

The system memory 1206 includes nonvolatile read-only memory (ROM) 1210 and random access memory (RAM) 1212, which may or may not include volatile memory elements. A basic input/output system (BIOS) 1214, containing the elementary routines that help to transfer information between elements within computation resource 1202 and with external items, typically invoked into operating memory during start-up, is stored in ROM 1210.

The computation resource 1202 further may include a non-volatile read/write memory 1216, represented in FIG. 12 as a hard disk drive, coupled to bus 1208 via a data media interface 1217 (e.g., a SCSI, ATA, or other type of interface); a magnetic disk drive (not shown) for reading from, and/or writing to, a removable magnetic disk 1220 and an optical disk drive (not shown) for reading from, and/or writing to, a removable optical disk 1226 such as a CD, DVD, or other optical media.

The non-volatile read/write memory 1216 and associated computer-readable media provide nonvolatile storage of computer-readable instructions, data structures, program modules and other data for the computation resource 1202. Although the exemplary environment 1200 is described herein as employing a non-volatile read/write memory 1216, a removable magnetic disk 1220 and a removable optical disk 1226, it will be appreciated by those skilled in the art that other types of computer-readable media which can store data that is accessible by a computer, such as magnetic cassettes, FLASH memory cards, random access memories (RAMs), read only memories (ROM), and the like, may also be used in the exemplary operating environment.

A number of program modules may be stored via the non-volatile read/write memory 1216, magnetic disk 1220, optical disk 1226, ROM 1210, or RAM 1212, including an operating system 1230, one or more application programs 1232, other program modules 1234 and program data 1236. Examples of computer operating systems conventionally employed for some types of three-dimensional and/or two-dimensional medical image data include the NUCLEUS® operating system, the LINUX® operating system, and others, for example, providing capability for supporting application programs 1232 using, for example, code modules written in the C++® computer programming language.

A user may enter commands and information into computation resource 1202 through input devices such as input media 1238 (e.g., keyboard/keypad, tactile input or pointing device, mouse, foot-operated switching apparatus, joystick, touchscreen or touchpad, microphone, antenna etc.). Such input devices 1238 are coupled to the processing unit 1204 through a conventional input/output interface 1242 that is, in turn, coupled to the system bus. A monitor 1250 or other type of display device is also coupled to the system bus 1208 via an interface, such as a video adapter 1252.

The computation resource 1202 may include capability for operating in a networked environment (as illustrated in FIG. 1, for example) using logical connections to one or more remote computers, such as a remote computer 1260. The remote computer 1260 may be a personal computer, a server, a router, a network PC, a peer device or other common network node, and typically includes many or all of the elements described above relative to the computation resource 1202. In a networked environment, program modules depicted relative to the computation resource 1202, or portions thereof, may be stored in a remote memory storage device such as may be associated with the remote computer 1260. By way of example, remote application programs 1262 reside on a memory device of the remote computer 1260. The logical connections represented in FIG. 12 may include interface capabilities, e.g., such as a storage area network (SAN, not illustrated in FIG. 12), local area network (LAN) 1272 and/or a wide area network (WAN) 1274, but may also include other networks.

Such networking environments are commonplace in modern computer systems, and in association with intranets and the Internet. In certain embodiments, the computation resource 1202 executes an Internet Web browser program (which may optionally be integrated into the operating system 1230), such as the "Internet Explorer®" Web browser manufactured and distributed by the Microsoft Corporation of Redmond, Wash.

When used in a LAN-coupled environment, the computation resource 1202 communicates with or through the local area network 1272 via a network interface or adapter 1276. When used in a WAN-coupled environment, the computation resource 1202 typically includes interfaces, such as a modem 1278, or other apparatus, for establishing communications with or through the WAN 1274, such as the Internet. The modem 1278, which may be internal or external, is coupled to the system bus 1208 via a serial port interface.

In a networked environment, program modules depicted relative to the computation resource 1202, or portions thereof, may be stored in remote memory apparatus. It will be appreciated that the network connections shown are exemplary, and other means of establishing a communications link between various computer systems and elements may be used.

A user of a computer may operate in a networked environment 100 using logical connections to one or more remote computers, such as a remote computer 1260, which may be a personal computer, a server, a router, a network PC, a peer device or other common network node. Typically, a remote computer 1260 includes many or all of the elements described above relative to the computer 1200 of FIG. 12.

The computation resource 1202 typically includes at least some form of computer-readable media. Computer-readable media may be any available media that can be accessed by the computation resource 1202. By way of example, and not limitation, computer-readable media may comprise computer storage media and communication media.

Computer storage media include volatile and nonvolatile, removable and non-removable media, implemented in any method or technology for storage of information, such as computer-readable instructions, data structures, program modules or other data. The term "computer storage media" includes, but is not limited to, RAM, ROM, EEPROM, FLASH memory or other memory technology, CD, DVD, or other optical storage, magnetic cassettes, magnetic tape, magnetic disk storage or other magnetic storage devices, or any other media which can be used to store computer-intelligible information and which can be accessed by the computation resource 1202.

Communication media typically embodies computer-readable instructions, data structures, program modules or other data, represented via, and determinable from, a modulated data signal, such as a carrier wave or other transport mechanism, and includes any information delivery media. The term "modulated data signal" means a signal that has one or more of its characteristics set or changed in such a manner as to encode information in the signal in a fashion amenable to computer interpretation.

By way of example, and not limitation, communication media include wired media, such as wired network or direct-wired connections, and wireless media, such as acoustic, RF, infrared and other wireless media. The scope of the term computer-readable media includes combinations of any of the above.

The computer 1202 may function as one or more of the control segments of module 120 (FIG. 1), the computer 130, the operator console 140 and/or the data acquisition and conditioning module 160, for example, via implementation of the processes 200 and 300 of FIGS. 2 and 3, as one or more computer program modules.

V. CONCLUSION

The disclosed examples combine a number of useful features and present advantages in modern hospital settings. These examples leverage prior capabilities associated with mobile x-ray imaging tools, including mechanical and electrical reliability under a wide range of potentially-applicable circumstances. Additionally, compatibility with existing tools and modes for image data representation, and conventional image data storage and exchange standards facilitate interoperability with existing modules developed for those purposes, as well as promoting compatibility with newer approaches, such as integrated surgical navigation. The disclosed capabilities also benefit from compatibility with existing systems, and thus coordinate with other operator training, reducing probability of error, such as may occur in time-critical scenarios.

These examples additionally employ tools for remote, table-side positioning, in fashions often familiar to many physicians from prior experience with other mobile medical imaging tools, such as mobile fluoroscopic tools employed in contexts including cardiac surgery. Combining surgical navigation sensors with motorized, operator-directed imaging tool motion enhances a gamut of opportunities for automated positioning solutions. Maintaining broad compatibility with requirements for ancillary elements needed in the surgical environment, such as cart draping accessories and c-arm or other gantry or support mechanism draping, reduces the breadth of inventory items needed for infrastructural elements, presenting cost and supply management benefits, and aiding in appropriate deployment of those types of items in usage.

Although specific embodiments have been illustrated and described herein, it will be appreciated by those of ordinary skill in the art that any arrangement which is calculated to achieve the same purpose may be substituted for the specific embodiments shown. This disclosure is intended to cover any adaptations or variations. For example, although described in procedural terms, one of ordinary skill in the art will appreciate that implementations can be made in a procedural design environment or any other design environment that provides the required relationships.

In particular, one of skill in the art will readily appreciate that the names or labels of the processes and apparatus are not intended to limit embodiments. Furthermore, additional processes and apparatus can be added to the components, functions can be rearranged among the components, and new components to correspond to future enhancements and physical devices used in embodiments can be introduced without departing from the scope of embodiments. One of skill in the art will readily recognize that embodiments are applicable to future communication devices, different file systems, and new data types. The terminology used in this disclosure is meant to include all object-oriented, database and communication environments and alternate technologies which provide the same functionality as described herein.

What is claimed is:

1. A process for a purpose specific enhancement filtering of anatomical data, the process comprising:
   acquiring a body of voxel data using a medical imaging system;
   selecting a specific purpose involving a plurality of processing tasks to be applied on the anatomical data;
   setting, on the medical imaging system, specific parameter values for the specific purpose;
   enhancing the body of voxel data using a segmentation based three-dimensional filtering with purpose specific parameter values to obtain enhanced anatomical data, wherein enhancing includes combining weighted contributions from anisotropically smoothed foreground voxel data, isotropically smoothed background voxel data, and the body of voxel data to form the enhanced anatomical data;
   using the enhanced anatomical data for the processing tasks of the specific purpose; and
   generating an image using the intermediate voxel data.

2. The process of claim 1, wherein the act of selecting a purpose specific task includes an act of selecting one of:
   visualization of an image formed using at least a portion of the enhanced anatomical data;
   differentiation and characterization of distinct areas within an anatomical volume represented by the enhanced anatomical data; and
   detection of tissue abnormality.

3. A process for a purpose specific enhancement filtering of anatomical data, wherein the anatomical data comprises a body of voxel data, the enhanced anatomical data comprises intermediate voxel data, the process comprising:
   selecting a specific purpose involving a plurality of processing, tasks to be applied on the anatomical data;
   setting specific parameter values for the specific purpose;
   enhancing the data using a segmentation based three-dimensional filtering with purpose specific parameter values to obtain enhanced anatomical data; the act of enhancing including
   identifying edge portions within the body of voxel data by comparing three-dimensional gradient vectors computed at each location of a series of locations within the body of voxel data to a threshold value determined by the act of setting;

segmenting the body of voxel data into foreground regions and background regions, based on the edge portions;

defining a boundary between the foreground and background regions using the three-dimensional gradient vectors and the threshold value, the boundary comprising a series of two-dimensional planar portions each instantaneously orthogonal to the respective three-dimensional gradient at each location;

anisotropically smoothing voxel data corresponding to the foreground regions to provide smoothed foreground voxel data;

isotropically smoothing voxel data corresponding to the background regions to provide smoothed background data; and combining weighted contributions from each of the smoothed foreground voxel data, the smoothed background voxel data and the body of voxel data to form the intermediate voxel data;

using the enhanced anatomical data for the processing tasks of the specific purpose.

4. The process of claim 1, wherein the act of setting includes an act of setting parameter values for at least a focus parameter, a smooth parameter and an edge parameter, the focus parameter value determining a threshold value as a purpose specific parameter value.

5. The process of claim 1, wherein the act of segmenting comprises segmenting the body of voxel data into either:
foreground regions corresponding to anatomical structures; and
background regions corresponding to non-structures.

6. The process of claim 1, wherein the act of enhancing includes acts of:
segmenting the body of voxel data into foreground regions and background regions, based on edge portions identified by comparison of three-dimensional gradient vectors to a threshold value determined by the act of setting; and
isotropically smoothing voxel data corresponding to the background regions via an isotropic three-dimensional Gaussian filter using an isotropic smooth parameter value determined by the act of setting to homogeneously reduce noise in the body of voxel data.

7. The process of claim 1, wherein the act of enhancing includes acts of:
segmenting the body of voxel data into foreground regions and background regions, based on edge portions identified by comparison of three-dimensional gradient vectors to a threshold value determined by the act of setting; and
anisotropically smoothing voxel data corresponding to the foreground regions using an anisotropic smooth parameter value determined by the act of setting.

8. A module for purpose-specific enhancement filtering of anatomical data, the module comprising elements for:
acquiring a body of anatomical data using a medical imaging system;
selecting at least one specific purpose involving a plurality of processing tasks to be applied on the anatomical data;
setting, on the medical imaging system, specific parameter values for the specific purpose;
enhancing the body of anatomical data using a segmentation based three-dimensional filtering with purpose specific parameter values to obtain an enhanced anatomical data, wherein enhancing includes combining contributions from foreground voxel data, background voxel data, and the body of voxel data to form the enhanced voxel data;
using the enhanced body of anatomical data for the selected specific purpose; and
generating an image using the enhanced body of anatomical data.

9. The module of claim 8, wherein the element for selecting a purpose specific task includes an element allowing the user to select one of:
visualization of an image formed using at least a portion of the enhanced anatomical data;
differentiation and characterization of distinct areas within an anatomical volume represented by the enhanced anatomical data; and
detection of tissue abnormality.

10. The module of claim 8, wherein the anatomical data comprises a body of voxel data, the enhanced anatomical data comprises intermediate voxel data, and the enhancing element includes elements for:
identifying edge portions within the body of voxel data by comparing three-dimensional gradient vectors computed at each location of a series of locations within the body of voxel data to a threshold value determined by the act of setting;
segmenting the body of voxel data into foreground regions and background regions, based on the edge portions;
defining a boundary between the foreground and background regions using the three-dimensional gradient vectors and the threshold value, the boundary comprising a series of two-dimensional planar portions each instantaneously orthogonal to the respective three-dimensional gradient at each location;
anisotropically smoothing voxel data corresponding to the foreground regions to provide smoothed foreground voxel data;
isotropically smoothing voxel data corresponding to the background regions to provide smoothed background data; and
combining weighted contributions from each of the smoothed foreground voxel data, the smoothed background voxel data and the body of voxel data to form the intermediate voxel data.

11. The module of claim 8, wherein the act of setting element includes an element for setting parameter values for at least a focus parameter, a smooth parameter and an edge parameter, the focus parameter value determining the ~ threshold value as a purpose specific parameter value.

12. The module of claim 8, wherein the module and the elements comprise computer-readable instructions embodied on a storage medium and coupled to one or more processors for executing the instructions.

13. The module of claim 8, wherein the segmenting element comprises an element for segmenting the body of voxel data into either:
foreground regions corresponding to anatomical structures; and
background regions corresponding to non-structures.

14. The module of claim 8, wherein the enhancing element includes elements for:
segmenting the body of voxel data into foreground regions and background regions, based on edge portions identified by comparison of three-dimensional gradient vectors to a threshold value determined by the act of setting; and
isotropically smoothing voxel data corresponding to the background regions via an isotropic three-dimensional Gaussian filter using an isotropic smooth parameter value determined by the act of setting to homogeneously reduce noise in the body of voxel data.

15. The module of claim 8, wherein the enhancing element includes elements for:
   segmenting the body of voxel data into foreground regions and background regions, based on edge portions identified by comparison of three-dimensional gradient vectors to a threshold value determined by the act of setting; and
   anisotropically smoothing voxel data corresponding to the foreground regions using an anisotropic smooth parameter value determined by the act of setting.

16. An apparatus for purpose-specific enhancement filtering of an anatomical dataset, the apparatus comprising:
   an interface for permitting a user to select a purpose from a list of predetermined purposes;
   a selection component for permitting the user to set parameter values consistent with the selected purpose; and
   an enhancement component for enhancing the anatomical dataset using a segmentation based three-dimensional filtering with purpose specific parameter values to obtain an enhanced anatomical dataset that has been enhanced for the selected specific purpose, wherein the enhancement component combines contributions from foreground voxel data, background voxel data, and the anatomical dataset to form the enhanced anatomical dataset; and
   an output component for outputting the enhanced anatomical dataset.

17. The apparatus of claim 16, wherein the interface is capable of permitting the user to select at least among components configured to:
   visualize an image formed using at least a portion of the enhanced anatomical dataset;
   differentiate and characterize distinct areas within an anatomical volume represented by the enhanced anatomical dataset; and
   detect tissue abnormality, and wherein:
   the anatomical dataset comprises a body of voxel data, the enhanced anatomical dataset comprises intermediate voxel data, and the enhancement component is configured to perform acts of:
   identifying edge portions within the body of voxel data by comparing three-dimensional gradient vectors computed at each location of a series of locations within the body of voxel data to a threshold value determined by the act of setting;
   segmenting the body of voxel data into foreground regions and background regions, based on the edge portions;
   defining a boundary between the foreground and background regions using the three-dimensional gradient vectors and the threshold value, the boundary comprising a series of two-dimensional planar portions each instantaneously orthogonal to the respective three-dimensional gradient at each location;
   anisotropically smoothing voxel data corresponding to the foreground regions to provide smoothed foreground voxel data;
   isotropically smoothing voxel data corresponding to the background regions to provide smoothed background data; and
   combining weighted contributions from each of the smoothed foreground voxel data, the smoothed background voxel data and the body of voxel data to form the intermediate voxel data.

18. The apparatus of claim 16, wherein the selection component includes capability for performing an act of setting parameter values for at least a focus parameter, a smooth parameter and an edge parameter, the focus parameter value determining a threshold value as a purpose specific parameter value.

19. The apparatus of claim 16, wherein the enhancement component is configured to perform acts of:
   segmenting the body of voxel data into foreground regions and background regions, based on edge portions identified by comparison of three-dimensional gradient vectors to a threshold value determined by the setting component; and
   isotropically smoothing voxel data corresponding to the background regions via an isotropic three-dimensional Gaussian filter using an isotropic smooth parameter value determined by the act of setting to homogeneously reduce noise in the body of voxel data.

20. The apparatus of claim 16, wherein the enhancement component is configured to perform acts of:
   segmenting the body of voxel data into foreground regions and background regions, based on edge portions identified by comparison of three-dimensional gradient vectors to a threshold value determined by the setting component; and
   anisotropically smoothing voxel data corresponding to the foreground regions using an anisotropic smooth parameter value determined by the setting component.

21. A process for enhancing anatomical data, the process comprising:
   acquiring a body of voxel data using a medical imaging system;
   identifying edge portions within the body of voxel data;
   segmenting the body of voxel data into foreground regions and background regions based on the edge portions;
   anisotropically smoothing voxel data corresponding to the foreground regions to generate smoothed foreground voxel data;
   isotropically smoothing voxel data corresponding to the background regions to generate smoothed background data; and
   combining portions of the smoothed foreground voxel data, the smoothed background voxel data and the enhanced anatomical data; and
   generating an image using the enhanced anatomical data.

22. A process in accordance with claim 21 wherein enhancing further includes combining weighted portions from the anisotropically smoothed foreground voxel data, the isotropically smoothed background voxel data, and the body of voxel data to form the enhanced anatomical data.

23. A process in accordance with claim 21 further comprising identifying the edge portions within the body of voxel data by comparing three-dimensional gradient vectors computed at each location of a series of locations within the body of voxel data to a threshold value determined by the act of setting.

24. A process in accordance with claim 21 wherein the combining further comprises:
   selecting a weighting parameter that is based on the identified edge portions;
   weighting a portion of the smoothed foreground voxel data and the smoothed background voxel data; and
   combining the weighted portions of the smoothed foreground voxel data, the smoothed background voxel data, and the body of voxel data to form the enhanced anatomical data.

* * * * *